United States Patent
Baltas

(10) Patent No.: US 8,291,689 B2
(45) Date of Patent: Oct. 23, 2012

(54) CORRUGATED CORE COWL FOR A GAS TURBINE ENGINE

(75) Inventor: Constantine Baltas, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 693 days.

(21) Appl. No.: 12/444,487

(22) PCT Filed: Oct. 12, 2006

(86) PCT No.: PCT/US2006/039050
§ 371 (c)(1),
(2), (4) Date: Apr. 6, 2009

(87) PCT Pub. No.: WO2008/045035
PCT Pub. Date: Apr. 17, 2008

(65) Prior Publication Data
US 2010/0089028 A1   Apr. 15, 2010

(51) Int. Cl.
*F02K 3/02*  (2006.01)
(52) U.S. Cl. .......... 60/226.3; 60/226.1; 60/770; 60/771; 181/213
(58) Field of Classification Search ............ 60/770, 60/771, 226.1, 226.3; 181/213
See application file for complete search history.

(56) References Cited

U.S. PATENT DOCUMENTS

| 3,279,192 | A |   | 10/1966 | Hull, Jr. et al. |
| 3,662,556 | A |   | 5/1972  | Poucher et al.   |
| 3,756,026 | A |   | 9/1973  | Timms et al.     |
| 3,967,443 | A |   | 7/1976  | McMurtry         |
| 4,279,382 | A | * | 7/1981  | Wilson, Jr. ................. 239/11 |

FOREIGN PATENT DOCUMENTS

| GB | 2372779 A | * | 9/2002 |
| JP | 11159399  |   | 6/1999 |

OTHER PUBLICATIONS

International Search Report and Written Opinion of the International Searching Authority for International application No. PCT/US2006/039050 mailed Jul. 17, 2007.
International Preliminary Report on Patentability for International application No. PCT/US2006/039050 mailed Jan. 28, 2009.

* cited by examiner

*Primary Examiner* — William H Rodriguez
*Assistant Examiner* — Craig Kim
(74) *Attorney, Agent, or Firm* — Carlson, Gaskey & Olds PC

(57) ABSTRACT

An example core nacelle for a gas turbine engine includes a core cowl positioned adjacent to an inner duct boundary of a fan bypass passage having an associated cross-sectional area. The core cowl includes at least one groove that is selectively exposed to change the cross-sectional area.

24 Claims, 2 Drawing Sheets

CORRUGATED CORE COWL FOR A GAS TURBINE ENGINE

BACKGROUND OF THE INVENTION

This invention generally relates to a gas turbine engine, and more particularly to a turbofan gas turbine engine having a core nacelle including a corrugated core cowl.

In an aircraft gas turbine engine, such as a turbofan engine, air is pressurized in a compressor, and mixed with fuel and burned in a combustor for generating hot combustion gases. The hot combustion gases flow downstream through turbine stages that extract energy from the gases. A high pressure turbine powers the compressor, while a low pressure turbine powers a fan disposed upstream of the compressor.

Combustion gases are discharged from the turbofan engine through a core exhaust nozzle, and fan air is discharged through an annular fan exhaust nozzle defined at least partially by a fan nacelle surrounding the core engine. A significant amount of propulsion thrust is provided by the pressurized fan air which is discharged through the fan exhaust nozzle. The combustion gases are discharged through the core exhaust nozzle to provide additional thrust.

A significant amount of the air pressurized by the fan bypasses the engine for generating propulsion thrust in turbofan engines. High bypass turbofans typically require large diameter fans to achieve adequate turbofan engine efficiency. Therefore, the nacelle of the turbofan engine must be large enough to support the large diameter fan of the turbofan engine. Disadvantageously, the relatively large size of the nacelle results in increased weight, noise and drag that may offset the propulsive efficiency achieved by the high bypass turbofan engine.

It is known in the field of aircraft gas turbine engines that the performance of the turbofan engine varies during diverse flight conditions experienced by the aircraft. Typical turbofan engines are designed to achieve maximum performance during normal cruise operation of the aircraft. Therefore, when combined with the necessity of a relatively large nacelle size, increased noise and decreased efficiency may be experienced by the aircraft at non-cruise operability conditions such as take-off, landing, cruise maneuver and the like.

Accordingly, it is desirable to provide a turbofan engine having a variable discharge airflow cross-sectional area that achieves noise reductions and improved fuel economy in a relatively inexpensive and non-complex manner.

SUMMARY OF THE INVENTION

An example core nacelle for a gas turbine engine includes a core cowl positioned adjacent to an inner duct boundary of a fan bypass passage having an associated cross-sectional area. The core cowl includes at least one groove that is selectively exposed to change the cross-sectional area.

An example gas turbine engine system includes a fan nacelle, a core nacelle within the fan nacelle that includes a core cowl having at least one groove, a sensor that produces a signal representing an operability condition and a controller in communication with the sensor to move the core cowl between a first position and second position. The at least one groove defined by the core cowl is positioned adjacent to a fan exhaust nozzle. The core cowl is moveable between the first position corresponding to a first discharge airflow cross-sectional area and the second position corresponding to a second discharge airflow cross-sectional area greater than the first discharge airflow cross-sectional area of the first position in response to the signal from the sensor.

An example method of controlling the discharge airflow cross-sectional area of the gas turbine engine includes sensing an operability condition and selectively exposing at least one groove of a core cowl in response to sensing the operability condition to influence the discharge airflow cross-sectional area. The operability condition includes at least one of a takeoff condition, an approach condition and a climb condition.

The various features and advantages of this invention will become apparent to those skilled in the art from the following detailed description. The drawings that accompany the detailed description can be briefly described as follows.

DETAILED DESCRIPTION OF THE PREFERRED EMBODIMENT

Figure 1:
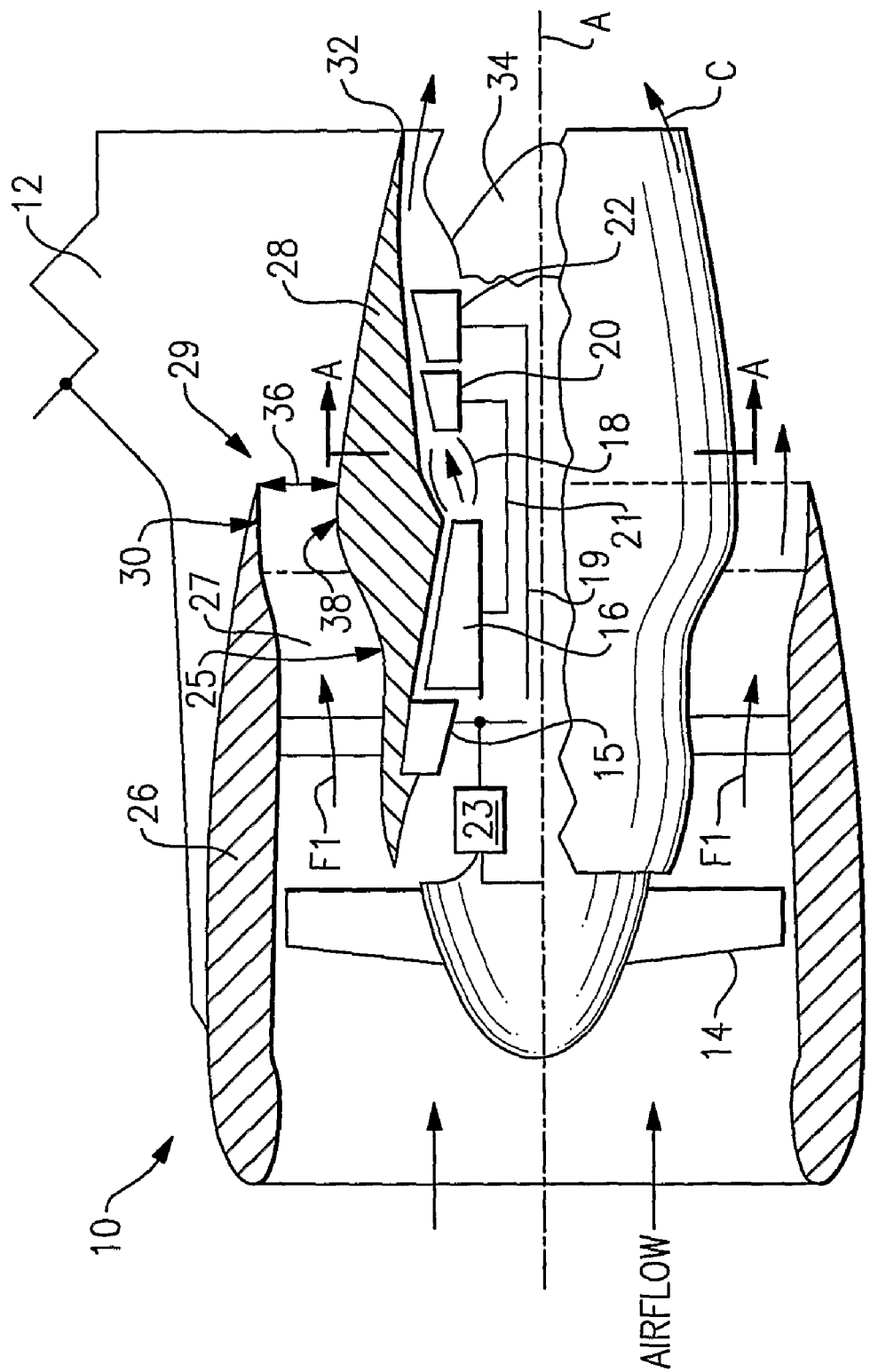
FIG. 1 illustrates a general perspective view of an example gas turbine engine.

Referring to FIG. 1, a gas turbine engine 10 suspends from an engine pylon 12 as is typical of an aircraft designed for subsonic operation. In one example, the gas turbine engine is a geared turbofan aircraft engine. The gas turbine engine 10 includes a fan section 14, a low pressure compressor 15, a high pressure compressor 16, a combustor 18, a high pressure turbine 20 and a low pressure turbine 22. A low speed shaft 19 rotationally supports the low pressure compressor 15 and the low pressure turbine 22 and drives the fan section 14 through a gear train 23. A high speed shaft 21 rotationally supports the high pressure compressor 16 and a high pressure turbine 20. The low speed shaft 19 and the high speed shaft 21 rotate about a longitudinal centerline axis A of the gas turbine engine 10.

During operation, air is pressurized in the compressors 15, 16 and mixed with fuel and burned in the combustor 18 for generating hot combustion gases. The hot combustion gases flow through the high and low pressure turbines 20, 22 which extract energy from the hot combustion gases.

The example gas turbine engine 10 is in the form of a high bypass ratio (i.e., low fan pressure ratio geared) turbofan engine mounted within a fan nacelle 26, in which most of the air pressurized by the fan section 14 bypasses the core engine itself for the generation of propulsion thrust. The example illustrated in FIG. 1 depicts a high bypass flow arrangement in which approximately 80% of the airflow entering the fan nacelle 26 may bypass the core nacelle 28 via a fan bypass passage 27. The high bypass flow arrangement provides a significant amount of thrust for powering the aircraft.

In one example, the bypass ratio is greater than ten, and the fan section 14 diameter is substantially larger than the diameter of the low pressure compressor 15. The low pressure turbine 22 has a pressure ratio that is greater than five, in one example. The gear train 23 can be any known gear system, such as a planetary gear system with orbiting planet gears, planetary system with non-orbiting planet gears, or other type of gear system. In the disclosed example, the gear train 23 has a constant gear ratio. It should be understood, however, that the above parameters are only exemplary of a contemplated geared turbofan engine. That is, the invention is applicable to other engine architectures.

A fan discharge airflow F1 is communicated within the fan bypass passage 27 and is discharged from the engine 10 through a fan exhaust nozzle 30, defined radially between a core nacelle 28 and the fan nacelle 26. Core exhaust gases C are discharged form the core nacelle 28 through a core exhaust nozzle 32 defined between the core nacelle 28 and a tail cone 34 disposed coaxially therein around the longitudinal centerline axis A of the gas turbine engine 10.

The fan exhaust nozzle 30 concentrically surrounds the core nacelle 28 near an aftmost segment 29 of the fan nacelle 26, in this example. In other examples, the fan exhaust nozzle 30 is located farther upstream but aft of the fan section 14. The fan exhaust nozzle 30 defines a discharge airflow cross-sectional area 36 between the fan nacelle 26 and the core nacelle 28 for axially discharging the fan discharge airflow F1 pressurized by the upstream fan section 14. The core nacelle 28 of the gas turbine engine 10 includes a core cowl 38. The core cowl 38 represents an exterior flow surface of a section of the core nacelle 28. The core cowl 38 is positioned adjacent an inner duct boundary 25 of the fan bypass passage 27.

Figure 2:
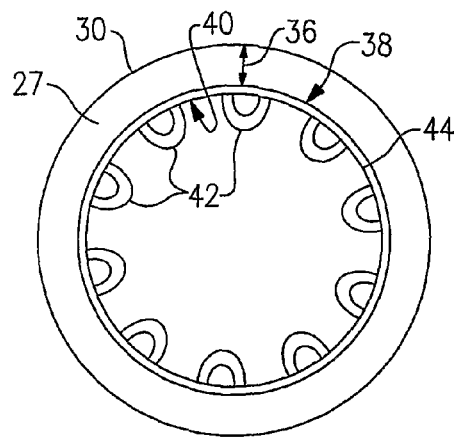
FIG. 2 illustrates an example core cowl in a closed position taken along section A-A of FIG. 1.

FIG. 2 illustrates an example arrangement of the core cowl 38. In this example, the core cowl 38 is in a closed position. An interior surface 40 of the core cowl 38 includes a plurality of grooves such as corrugations 42, for example. In one example, the corrugations 42 are generally crescent shaped. Although the example core cowl 38 is shown and described as having corrugations, it should be understood that the core cowl 38 may be designed including any other fluid channeling features to effectively increase the discharge airflow cross-sectional area 36. That is, the corrugations 42 provide additional area for the fan discharge airflow F1 to flow over the core cowl 38, as is further discussed below.

The plurality of corrugations 42 are manufactured from the same material as the core cowl 38. The plurality of corrugations 42 are individually disposed circumferentially about the interior surface 40 of the core cowl 38. That is, the plurality of corrugations 42 are not connected to one another.

In the closed position, the plurality of corrugations 42 are not exposed to the fan discharge airflow F1. Therefore, in this example, the discharge airflow cross-sectional area 36 extends between the aftmost segment 29 of the fan nacelle 26 and an outer sleeve 44 of the core cowl 38, as is further discussed below. In one example, the plurality of corrugations 42 are formed on the interior surface 40 of the core cowl 38 at a section of the core cowl 38 that is directly adjacent to an aftmost segment of the fan exhaust nozzle 30. However, the actual size, shape and location of the plurality of corrugations 42 will vary depending upon design specific parameters including, but not limited to, the size of the core nacelle 28 and the efficiency requirements of the gas turbine engine 10.

Figure 3:
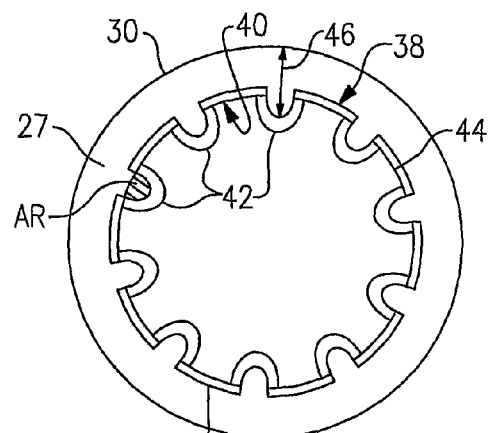
FIG. 3 illustrates the example core cowl in an open position to expose a plurality of corrugations taken along section A-A of FIG. 1.
Figure 3:
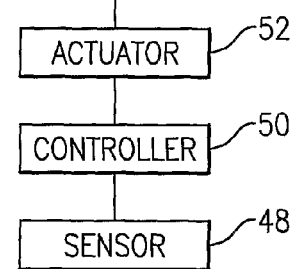

FIG. 3 shows the core cowl 38 in an open (i.e., actuated) position. Opening the core cowl 38 to expose the plurality of corrugations 42 during specific flight conditions provides noise reductions and improved fuel economy of the gas turbine engine 10. In one example, the discharge airflow cross-sectional area 36 of the gas turbine engine 10 is varied by opening the core cowl 38 between the closed position (FIG. 2) and the open position. The plurality of corrugations 42 are exposed to the fan discharge airflow F1 by an actuator assembly 52 (See FIG. 4) in response to detecting an operability condition.

In one example, the operability condition includes at least one of a take-off condition, an approach condition and a climb condition. Take-off conditions are experienced as the aircraft travels down the runway just prior to becoming airborne. Approach conditions are experienced during aircraft descent toward a landing strip to land the aircraft. Climb conditions are experienced where an aircraft reaches a certain altitude and cuts back against oncoming airflow to begin normal cruise operation. However, the plurality of corrugations 42 may be exposed in response to any known operability condition.

A discharge airflow cross-sectional area 46 associated with the opened core cowl 38 is greater than the discharge airflow cross-sectional area 36 of the core cowl 38 in its closed position. The discharge airflow cross-sectional area 46 includes the area defined by the discharge airflow cross-sectional area 36 and an area AR defined by each corrugation 42 to provide an increased airflow cross-sectional area for the fan discharge airflow F1. The actual size of the area AR of each corrugation 42 will depend upon design specific parameters including, but not limited to, the actual size and performance requirements of the gas turbine engine 10.

A sensor 48 detects the operability condition and communicates a signal to a controller 50 to open the core cowl 38 and expose the plurality of corrugations 42 via an actuator assembly 52. Of course, this view is highly schematic. It should be understood that the sensor 48 and the controller 50 may be programmed to detect known operability conditions. A person of ordinary skill in the art having the benefit of the teachings herein would be able to program the controller 50 to communicate with the actuator assembly 52 to move the core cowl 38 between the closed position and the open position. The actuator assembly 52 returns the core cowl 38 to the closed position, and the plurality of corrugations 42 are sealed from exposure to the fan discharge airflow F1, during normal cruise operation (e.g., a generally constant speed at generally constant, elevated altitude) of the aircraft.

Figure 4:
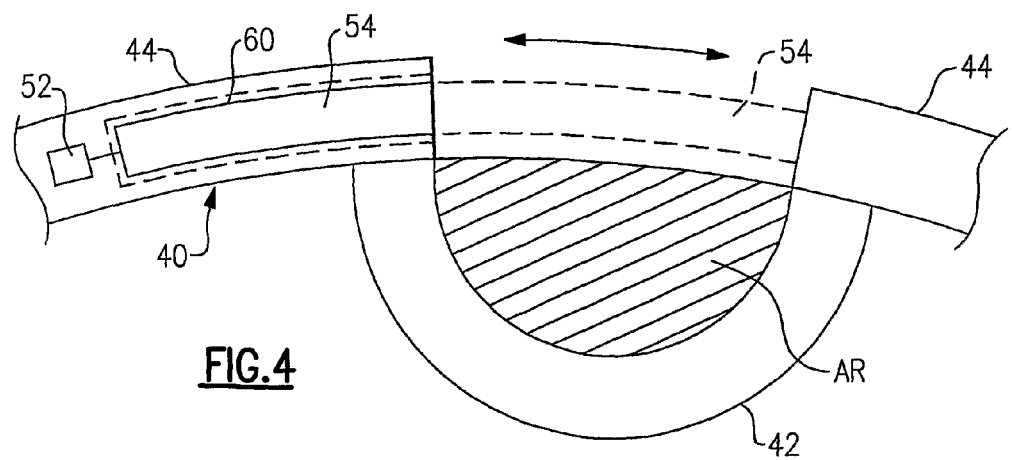
FIG. 4 shows an exploded view of a section of a slideable outer sleeve of the example core cowl for exposing the plurality of corrugations.

FIG. 4 illustrates a section of the outer sleeve 44 of the core cowl 38. The outer sleeve 44 is disposed coaxially about the core cowl 38 and includes a plurality of flap sections 54. For simplification, only one flap section 54 is shown. The flap section 54 is selectively movable by the actuator assembly 52 to expose the corrugation 42 in response to detecting the operability condition. The flap section 54 is circumferentially rotatable about the engine centerline axis A. In one example, the flap section 54 slides in a clockwise direction. In another example, the flap section 54 moves in a counter-clockwise direction. In yet another example, the flap section 54 moves in both a clockwise and a counter-clockwise direction.

Each flap section 54 is stored within a cavity 60 of the outer sleeve 44 where the core cowl 38 is actuated to an open position. Therefore, the corrugations 42 are exposed to the fan discharge airflow F1 and an increased discharge airflow cross-sectional area is achieved. The increase in the discharge airflow cross-sectional area enables noise reductions and improves fuel economy of the gas turbine engine 10. In addition, control of the discharge airflow cross-sectional area provides control of the pressure of the gas turbine engine 10 within the fan bypass passage 27, which in turn provides control over the fan pressure ratio of the gas turbine engine. The actuator assembly 52 moves the flap section 54 within the cavity 60 in response to detecting an operability condition.

The actuator assembly 52 extends each flap section 54 between adjacent sections of the outer sleeve 44 where an increase in the discharge airflow cross-sectional area is no longer desired (i.e., during normal cruise operation).

One example actuator assembly 52 is an electric actuation device. In another example, the actuator assembly 52 is a hydraulic actuation device. A worker of ordinary skill in the art with the benefit of the teachings herein would understand how to translate the flap sections 54 of the outer sleeve 44 to expose the plurality of corrugations 42 and provide an increased flow area for the fan discharge airflow F1.

The foregoing description shall be interpreted as illustrative and not in any limiting sense. A worker of ordinary skill in the art would recognize that certain modifications would come within the scope of this invention. For that reason, the following claims should be studied to determine the true scope and content of this invention.

I claim:

1. A core nacelle for a gas turbine engine, comprising:
a core cowl positioned adjacent an inner duct boundary of a fan bypass passage having an associated cross-sectional area, wherein said core cowl includes at least one groove that extends radially inward from an interior surface of said core cowl, and said at least one groove is selectively exposed to increase said cross-sectional area to include an area defined by said at least one groove, wherein said core cowl includes an outer sleeve having a plurality of flap sections wherein each of said plurality of flap sections are selectively moveable to expose said at least one groove.

2. The core nacelle as recited in claim 1, wherein said at least one groove has an open position corresponding to a first cross-sectional area and a closed position corresponding to a second cross-sectional area less than said first cross-sectional area.

3. The core nacelle as recited in claim 2, wherein said at least one groove is sealed from a fan discharge airflow in said closed position and is exposed to said fan discharge airflow in said open position.

4. The core nacelle as recited in claim 1, wherein said at least one groove includes a plurality of grooves, said plurality of grooves each individually disposed circumferentially about an interior surface of said core cowl.

5. The core nacelle as recited in claim 1, wherein said plurality of flap sections are stored within a cavity to expose said at least one groove.

6. The core nacelle as recited in claim 1, wherein said plurality of flap sections are circumferentially rotatable about an engine centerline axis.

7. The core nacelle as recited in claim 1, wherein said at least one groove comprises a corrugation, said at least one groove being generally crescent shaped.

8. A gas turbine engine system, comprising:
a fan nacelle defined about an axis and having a fan exhaust nozzle;
a core nacelle at least partially within said fan nacelle, said core nacelle having a core cowl including at least one groove, said at least one groove defined on said core cowl adjacent said fan exhaust nozzle, wherein said core cowl is selectively moveable between a first position having a first discharge airflow cross-sectional area and a second position having a second discharge airflow cross-sectional area greater than said first discharge airflow cross-sectional area, wherein said core cowl includes an outer sleeve having a plurality of flap sections wherein each of said plurality of flap sections are selectively moveable to expose said at least one groove;
a fan section positioned within said fan nacelle;
at least one compressor and at least one turbine positioned downstream of said fan section;
at least one combustor positioned between said at least one compressor and said at least one turbine;
at least one sensor that produces a signal representing an operability condition; and
a controller that receives said signal, wherein said controller selectively moves said core cowl from said first position to said second position to expose said at least one groove of said core cowl in response to said signal.

9. The system as recited in claim 8, wherein said operability condition includes at least one of a take-off condition, an approach condition and a climb-condition.

10. The system as recited in claim 8, wherein said at least one groove is exposed to a fan discharge airflow in response to movement of said core cowl to said second position.

11. The system as recited in claim 8, comprising an actuator assembly in communication with said controller and operable to move said core cowl between said first position and said second position in response to said signal.

12. The stem system as recited in claim 8, wherein said fan exhaust nozzle is positioned adjacent an aftmost segment of said fan nacelle.

13. A method of influencing a discharge airflow cross-sectional area associated with a fan exhaust nozzle of a gas turbine engine, comprising the steps of:
(a) sensing an operability condition; and
(b) selectively exposing at least one groove of a core cowl at a radially inward position from the fan exhaust nozzle in response to sensing the operability condition to influence the discharge airflow cross-sectional area, wherein said core cowl includes an outer sleeve having a plurality of flap sections wherein each of said plurality of flap sections are selectively moveable to expose said at least one groove.

14. The method as recited in claim 13, wherein the operability condition includes at least one of a take-off condition, an approach condition, and a climb condition.

15. The method as recited in claim 13, wherein the core cowl is moveable between a first position corresponding to a first discharge airflow cross-sectional area and a second position corresponding to a second discharge airflow cross-sectional area greater than the first discharge airflow cross-sectional area, wherein said step (b) comprises:
moving the core cowl from the first position to the second position in response to sensing the operability condition.

16. The method as recited in claim 15, comprising the step of:
(c) returning the core cowl to the first position in response to detection of a cruise operation.

17. The method as recited in claim 13, wherein the core cowl includes an outer sleeve having a plurality of flap sections and said step (b) comprises:
sliding the plurality of flap sections in at least one of a clockwise direction and a counterclockwise direction relative to an engine centerline axis of the gas turbine engine to expose the at least one groove in response to sensing the operability condition.

18. The system as recited in claim 8, wherein said core cowl includes an outer sleeve having a plurality of flap sections that are circumferentially rotatable to expose said at least one groove.

19. The system as recited in claim 13, wherein the core cowl includes an outer sleeve having a plurality of flap sections and said step (b) comprises the step of:
circumferentially rotating the flap sections about an engine centerline axis to expose the at least one groove in response to sensing the operability condition.

20. The core nacelle as recited in claim 1, wherein said at least one groove is circumferentially disposed about an interior surface of said core cowl.

21. The core nacelle as recited in claim 1, wherein said at least one groove is exposed at a radially inward position from a fan exhaust nozzle.

22. The core nacelle as recited in claim 1, wherein said at least on groove extends radially inwardly from an outer sleeve of said core cowl.

23. The system as recited in claim 8, wherein said at least one groove is circumferentially disposed about an interior surface of said core cowl.

24. The system as recited in claim 8, wherein said at least on groove extends radially inwardly from an outer sleeve of said core cowl.

* * * * *